Feb. 23, 1960 J. W. TAUGNER 2,926,289
PULSE COUNTING CIRCUIT
Filed Oct. 16, 1956
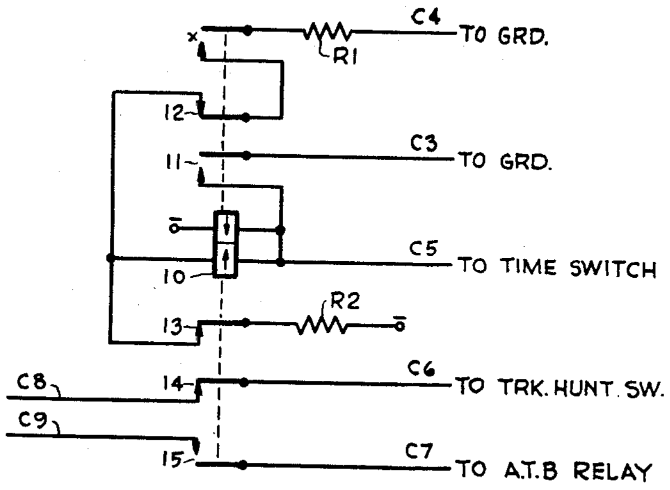
INVENTOR.
JACK W. TAUGNER
BY Mc Walter Owen
ATTY.

United States Patent Office 2,926,289

Patented Feb. 23, 1960

2,926,289

PULSE COUNTING CIRCUIT

Jack W. Taugner, Park Ridge, Ill., assignor to General Telephone Laboratories, Incorporated, a corporation of Delaware Application October 16, 1956, Serial No. 616,279

8 Claims. (Cl. 317—155.5)

The present invention relates to telephone systems in general, but is more particularly concerned with telephone system having pulse counting facilities.

It is an object of the present invention to provide in a pulse counting circuit, a relay completely operated for pulse counting responsive only to the withdrawal of more than one ground pulse.

It is another object of the present invention to provide in a pulse counting circuit of the character described, a circuit for preparing the complete operation of said relay responsive to the withdrawal of a first ground pulse.

A feature of the invention resides in the employment of a relay having two windings poled in opposition to each other, with both windings connected to a source of timed ground pulses, and having contacts including preliminary make contacts, whereby upon receipt of the first ground pulse the oppositely poled winding prevents operation of said relay. However, upon withdrawal of the first ground pulse the flux decay causes the relay to operate its preliminary make contacts and locks in this position. Upon receipt of the second ground pulse after a predetermined time interval, the oppositely poled windings will again prevent further operation of said relay, and upon withdrawal of said second ground pulse the relay receives another inductive kick which operates the relay completely, thus providing a pulse counting circuit having a relay that operates completely only after the withdrawal of two timed ground pulses of a predetermined duration.

The novel features believed to be characteristic of the invention are set forth with particularity in the appended claims. The invention, both as to its organization and method of operation, together with further objects and advantages thereof, will best be understood by reference to the specification taken in connection with the accompanying drawing, in which:

The drawing illustrates a pulse counting circuit having a relay with oppositely poled windings, including other circuitry for operation explanatory purposes.

In telephone exchanges, it is common practice to time switching operations, and provide means for speeding up the release of equipment after a predetermined time interval to avoid tying up the equipment needlessly. For instance, timing devices are employed for timing trunk hunting, the answering of calls by an operator or a called subscriber, the interval between dialled digits, the failure to dial after a predetermined time, and many other operations. However, most of these timing devices are rather complicated and expensive. Further, the circuitry and equipment needed for timing devices known heretofore, are space consuming. With the present invention, a novel but simple timing device is employed to overcome the above mentioned disadvantages of prior devices.

It will become quite apparent from a perusal of the following specification in conjunction with the drawing that the invention has many applications. Thus, the application set forth is merely for convenience of explanation of one of many applications for which it could readily be used. It is therefore to be understood that some of the operations will be assumed but understandable to anyone skilled or readily familiar with telephone equipment operations. The present invention will be applied therefore for convenience of explanation, to a register sender.

Referring to the drawing, there is shown a relay 10 having two windings oppositely poled, and a plurality of contacts including preliminary make contacts "X." The mechanical structure of this relay will be of the well-known type such as shown in Patent No. 2,473,982, issued to F. E. Wood on June 21, 1949. In relays of this well-known type where the heel piece is close to the relay core, it is well known that some magnetic flux leaks through the air from the core to the heel piece all along the length of this relay. This normal air flux leakage to the heel piece is small and ordinarily does not have any normal detrimental effect on the desired operation of the relay. In an instance of this kind, where the winding furthest from the armature is more highly energized than is the winding closest to the armature, the net practical effect is to increase the reluctance of the magnetic structure in the area adjacent to the armature to the flux set up by the more highly energized winding with the result that there is a much higher leakage of flux between the heel piece and coil. Thus we have a resultant flux set up in the structure which is much stronger at the heel end than at the armature end.

A plurality of conductors C3, C4, C6, C7, C8 and C9 are associated at one end with contacts of relay 10, and at the other end are to be assumed associated with equipment in the register sender. More specifically, it will be assumed that conductors C3 and C4 are connected to make contacts of two trunk hunting relays; conductor C6 to the stepping magnet of a rotary type trunk hunting switch; conductor C7 to an all trunks busy relay; conductors C8 and C9 to battery or ground depending upon the potential associated with the trunk hunting switch or the busy relay for operation. Conductor C5 will be assumed to be connected to certain contacts of a rotary type timing switch, over which a ground pulse will be transmitted every two seconds into the windings of relay 10 responsive to stepping of said timing switch.

A detailed explanation will now follow:

Assuming that the register sender (not shown) is seized, a pair of trunk hunting relays will operate, closing their contacts to place ground on conductors C3 and C4, and also a circuit is completed to the stepping magnet of a trunk hunting switch of the rotary type. It will be assumed that the last mentioned circuit includes conductor C8, contacts 14, and conductor C6. Assuming that all of the trunks accessible to said trunk hunting switch are to be busy, every two seconds the timing switch will take one step over a circuit not shown.

For a better understanding of the operations to follow, the circuit is quite stable assuming the following values: R1=600 ohms; R2=600 ohms; upper winding of relay 10=1300 ohms; lower winding of relay 10=1300 ohms; voltage at approximately 50 volts.

Responsive to the first ground pulse transmitted over conductor C5, the relay 10 will not operate because the windings are in opposition. This first ground pulse causes the lower winding to have a low level of current flow and the upper winding to have a high level of current flow, and being in opposition prevents the operation of relay 10. Upon the withdrawal of this ground pulse the collapsing field or fields will generate voltages in the two windings. The voltage generated in the upper winding will be higher than the voltage generated in the lower winding. The very nature of the circuit at this time is such that any current resulting from the collapsing flux must flow in series aiding. Since the voltage generated in the upper winding is higher, it should be obvious that the voltage generated in that winding will control direction of current flow. Thus, at the time the first ground pulse is withdrawn from terminal C5, current will be reversed in the lower winding and continue in the same direction in the upper winding. This current flowing in series aiding generates enough ampere turns to cause the preliminary make "X" contacts to close.

When the first inductive surge is dissipated and the "X" contacts closed, current is flowing in the two windings in series but, due to resistance R1 being in series with both windings and resistance R2 being in shunt of both windings in addition to the spring tension of the remaining springs, the combined windings do not generate sufficient magnetic flux to fully operate relay 10.

It must be pointed out that the lower winding which is adjacent the armature of the relay and which has less current flowing through it than the upper winding, therefore generates less flux while the ground is supplied at terminal C5. Thus it inhibits the buildup in the armature of flux generated by the upper winding. When this inhibition is cancelled by the fact that current ceases to flow in the lower winding, a great deal more of the flux generated by the upper winding appears in that part of the magnetic circuit which now includes the armature.

Thus, there are two factors which contribute to the operation of relay 10 for closing its "X" contacts only when the ground pulse is withdrawn.

(1) The collapsing flux generates a voltage in each winding. These voltages are of such polarity and magnitude that a current will flow in both windings in series aiding in such direction as to cause a flux buildup in the same direction as originally generated by the upper winding.

(2) The increased high air leakage flux from the upper winding which resulted from the opposition of the field of the lower winding, is now switched out of the air leakage path and into the effective iron magnetic circuit.

Also the gram pressure of other contacts on the structure prevents the relay from operating beyond closure of the "X" contacts.

It is to be recalled that all the trunks accessible to the trunk hunting switch were to be assumed busy, thus after another two second pause the timing switch will take another rotary step, whereby another ground pulse will be transmitted over conductor C5. The application of the second ground pulse will cause a reversal of current in the lower winding. The current flowing in the lower winding at this time will be lower than it was during the first ground pulse because of the effect of resistor R1. The current in the upper winding will return to the same approximate value as on the first ground pulse. However, after a short duration upon the withdrawal of the second ground pulse over conductor C5, the collapsing field will again generate voltages in the two windings. In this case, because of the greater excitation of the upper winding in relation to the lower winding, the series aiding current through the two windings resulting from the voltage generated in the upper winding will be higher than after the withdrawal of the first ground pulse. Thus, the flux built up by the upper winding is now sufficient to fully operate relay 10 and close its remaining spring contacts. This is understandable since the flux density was greater on the second application of a ground pulse, thus the voltage generated by the collapse of the field will be greater. The operation of relay 10, at contacts 11 completes a holding circuit for relay 10 via conductor C3, and the grounded contacts of the mentioned trunk hunting relay. At contacts 12, the holding circuit for the preliminary make contacts "X" is opened, and at contacts 13 the operating circuit for the "X" contacts is opened. At contacts 14, the circuit to the stepping magnet of the trunk hunting switch is opened to stop trunk hunting. At contacts 15, a circuit is closed to complete a circuit to the all trunks busy relay via conductors C9 and C7 to send an all trunks busy signal to the calling party in a manner well known in the art.

Responsive to the calling party receiving the all trunks busy signal, the termination of the call will restore the trunk hunting relays and remove ground from conductors C3 and C4 to restore relay 10 to its normal position. The pulse counting circuit is again available for future use.

It is to be understood that a source of ground pulses need not necessarily be transmitted every two seconds, since the time interval between ground pulses has no different effect on the relay than what has been described for a two second interval. Thus it is easily understandable that the time interval between ground pulses can be adjusted to coincide with the timing needed with respect to the equipment used with the present circuit. For instance, if the present invention were to be used for timing the answering of an operation on a toll call, the time allotted may be ten seconds, whereby two ground pulses may be transmitted every five seconds. It is also to be understood that the contacts on said relay may be used for controlling circuits other than those described.

While there has been described what is at present considered to be the preferred embodiment of the invention, it will be understood that various modifications may be made therein, and it is intended to cover in the appended claims all such modifications as fall within the true spirit and scope of the invention.

Having described my invention in detail, what I claim and desire to have protected by issuance of Letters Patent of the United States is set forth in the appended claims.

What is claimed is:

1. In a pulse counting circuit, a relay having two oppositely poled windings, a plurality of contacts including preliminary make contacts associated with said relay, each of said windings commonly connected to a source of timed ground pulses, circuit means causing said windings to act in opposition to each other to prevent operation of said relay responsive to the receipt of ground pulses, inductive means including said windings responsive to the withdrawal of a first ground pulse for energizing said relay to operate only said preliminary make contacts, and said inductive means effective after operation of said preliminary make contacts in response to the withdrawal of a second ground pulse to more fully energize said relay and operate all of said remaining contacts.

2. In a pulse counting circuit, a relay having two oppositely poled windings, a plurality of contacts including preliminary make contacts associated with said relay, each of said windings commonly connected to a source of timed ground pulses, a circuit means including a first resistance means connected to said windings to prevent operation of said relay responsive to the receipt of ground pulses, inductive means including said windings and said first resistance means acting in cooperation with the withdrawal of a first ground pulse to operate only said preliminary make contacts, a second resistance means connected to said windings by the operation of said preliminary make contacts to hold said preliminary make contacts operated, and said inductive means responsive to the withdrawal of a second ground pulse to create an unbalanced condition in the windings of said relay by said first and second resistances to completely energize said relay and operate said remaining plurality of contacts.

3. In a pulse counting circuit as claimed in claim 2, whereby the operation of one of said plurality of contacts completes a circuit for holding said relay completely energized.

4. In a pulse counting circuit, a relay, a first winding on said relay, a second winding on said relay wound in a direction opposite to said first winding, both of said windings commonly connected to a source of ground pulses, circuit means causing said windings to act in opposition to each other to prevent operation of said relay responsive to the receipt of ground pulses, a plurality of biased spring contacts including preliminary make spring contacts associated with said relay, said preliminary make spring contacts having less bias than said other spring contacts, said circuit means and said windings aiding each other responsive to the withdrawal of each ground pulse to energize said relay, inductive means including said windings causing the energization of the relay responsive to the withdrawal of a first ground pulse for operating only said less biased preliminary make spring contacts, and said inductive means responsive to the withdrawal of a second ground pulse for more fully energizing said relay to operate said remaining plurality of biased spring contacts.

5. In a pulse counting circuit, a relay, a first winding on said relay, a second winding on said relay wound in a direction opposite to said first winding, both of said windings commonly connected to a source of ground pulses, circuit means causing said windings to act in opposition to each other to prevent operation of said relay responsive to the receipt of ground pulses, inductive means including said windings acting responsive to the withdrawal of each ground pulse to induce a current in said windings in series, a plurality of biased spring contacts including preliminary make spring contacts associated with said relay, said preliminary spring contacts less biased than said other spring contacts, a first resistance means connected to said windings acting in cooperation with said inductive means for causing only a partial energization of said relay to thereby operate said less biased preliminary make contacts responsive to the withdrawal of a first ground pulse, a second resistance means connected to said windings by the operation of said preliminary make contacts for increasing the current flow through one of said windings and for decreasing the current flow in the other winding during the second application of a ground pulse, and the second ground withdrawal causing a greater inductive surge through said windings due to the inclusion of said second resistance means and to said change in current flow to fully operate said relay and said remaining plurality of contacts.

6. In a pulse counting circuit, a relay having two oppositely poled windings, each of said windings commonly connected to a source of ground pulses transmitted at predetermined time intervals, circuit means causing said windings to act in opposition to each other to prevent operation of said relay responsive to the receipt of each ground pulse, inductive means including said windings responsive to the withdrawal of a first ground pulse for preparing but preventing the complete operation of said relay, said inductive means and including the preparatory operation for completely operating said relay responsive to the withdrawal of a second ground pulse, to thus count the withdrawal of each ground pulse before operating said relay completely.

7. In a pulse counting circuit, a relay having two oppositely poled windings, each of said windings commonly connected to a source of ground pulses transmitted at predetermined time intervals, circuit means causing said windings to act in opposition to each other to prevent operation of said relay responsive to the receipt of each timed ground pulse, inductive means including said windings and said circuit means responsive to the withdrawal of a first ground pulse for preparing said relay for operation, a second circuit means including said inductive means effective responsive to the withdrawal of more than one timed ground pulse for unbalancing said windings to operate said relay, whereby the receipt and withdrawal of ground pulses are counted over a predetermined time interval before permitting complete operation of said relay.

8. In a pulse counting circuit, a relay having a plurality of contacts and a pair of windings commonly connected to a source of pulses, a circuit including a resistance and both windings of the relay for causing said windings to act in opposition to each other when a pulse is connected thereto to prevent the operation of said relay, inductive means for inducing a current flow in said circuit only sufficient to energize said relay to close certain of said contacts responsive to the cessation of a first pulse, another circuit completed by the closure of said certain contacts including a different resistance and both windings of the relay, and said inductive means inducing a current flow in said other circuit sufficient to energize said relay to close all of said contacts responsive to the cessation of a second pulse.

References Cited in the file of this patent

UNITED STATES PATENTS

| | | |
|---|---|---|
| 2,152,524 | Miller | Mar. 28, 1939 |
| 2,375,413 | Guenther | May 8, 1945 |